United States Patent [19]
Jang

[11] Patent Number: 5,946,270
[45] Date of Patent: Aug. 31, 1999

[54] OVER POWER SUPPLY VOLTAGE CUT-OFF CIRCUIT

[75] Inventor: Chul-Sang Jang, Daegu, Rep. of Korea

[73] Assignee: LG Semicon Co., Ltd., Cheongju, Rep. of Korea

[21] Appl. No.: 08/843,347

[22] Filed: Apr. 15, 1997

[30] Foreign Application Priority Data

Sep. 3, 1996 [KR] Rep. of Korea ............ 96-37948

[51] Int. Cl.⁶ ........................................... H02H 7/00
[52] U.S. Cl. .................................. 367/18; 361/91.2
[58] Field of Search ........................... 361/18, 54, 55, 361/56, 57, 58, 93, 100, 101, 91, 91.1, 91.2

[56] References Cited

U.S. PATENT DOCUMENTS

| | | | |
|---|---|---|---|
| 4,438,473 | 3/1984 | Cawley et al. | 361/18 |
| 4,835,649 | 5/1989 | Salerno | 361/18 |
| 5,485,342 | 1/1996 | Sugino et al. | 361/104 |
| 5,625,519 | 4/1997 | Atkins | 361/54 |

*Primary Examiner*—Ronald W. Leja

[57] ABSTRACT

An over power supply voltage cut-off circuit includes: a power supply voltage supplying path switching part for switching a supplying path of the power supply voltage provided to the power consumption type of load from the power supply voltage generating part in accordance with a driving control signal; a voltage sensing part for sensing an abnormal voltage, in case where a level of the power supply voltage generated from the power supply voltage generating part is over a predetermined set voltage level; and a control signal converting part for converting the driving control signal supplied to the power supply voltage supplying path switching part from the voltage sensing part into a transmission cut-off control signal in accordance with a sensing signal outputted from the voltage sensing part.

12 Claims, 3 Drawing Sheets

FIG.1A
CONVENTIONAL ART
FIG.1B
CONVENTIONAL ART
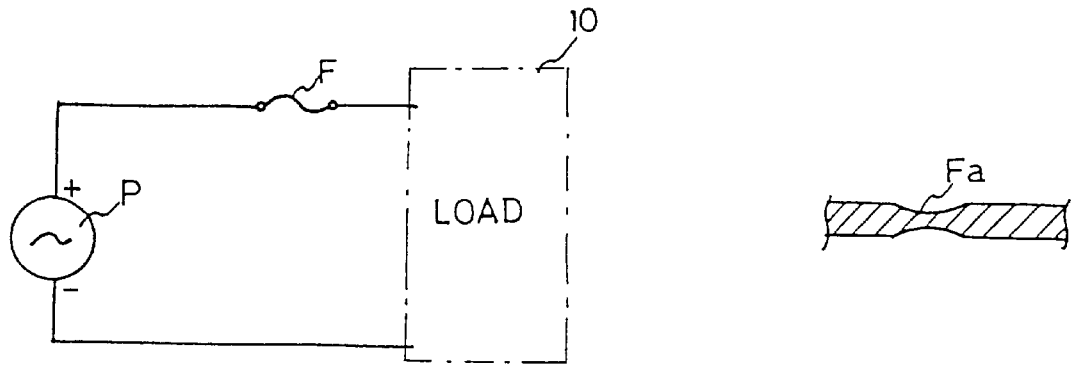
FIG.2
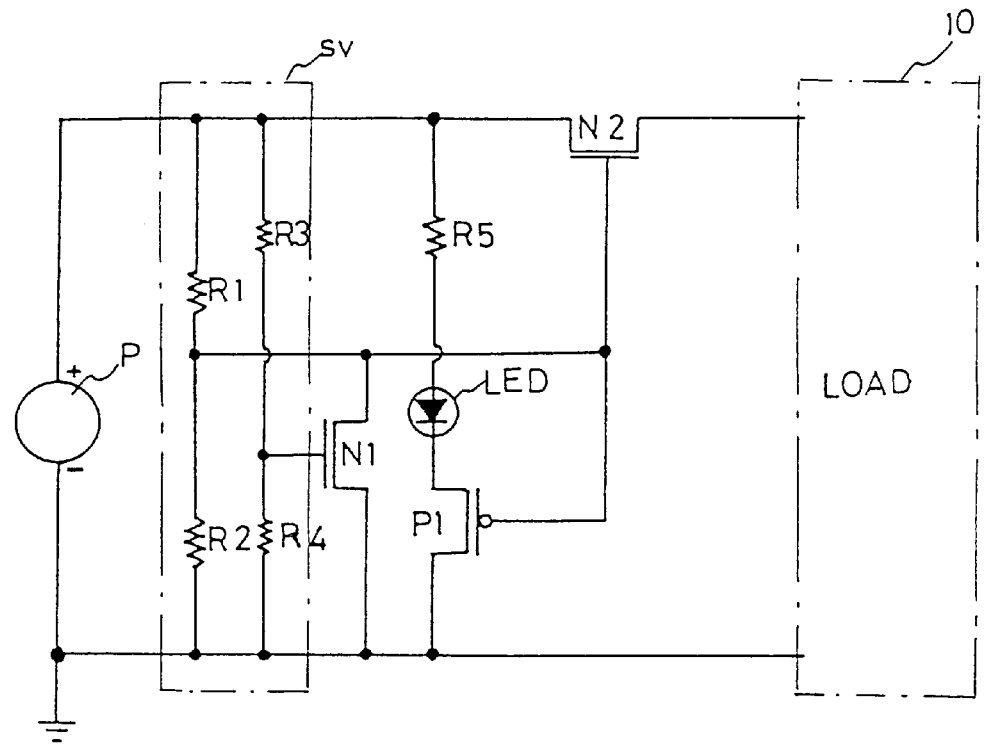

5,946,270

OVER POWER SUPPLY VOLTAGE CUT-OFF CIRCUIT

BACKGROUND OF THE INVENTION

1. Field of the Invention

The present invention relates to a power supply voltage control circuit, and more particularly, to an over power supply voltage cut-off circuit which is capable of automatically cutting off a power supply voltage supplying path between a power supply voltage and a system by detecting an over power supply voltage, e.g., where the power supply voltage exceeds a predetermined voltage level, to thereby prevent the system from being damaged or impacted.

The present invention further relates to an overvoltage dropping circuit which is capable of dropping an overvoltage to a normal voltage level when the overvoltage occurs, to thereby provide a stable voltage to a load circuit.

2. Discussion of Related Art

Generally, one of the methods used to protect a specific load from an unstable power supply voltage or a momentary overvoltage is to adopt a fuse on a power supply voltage supplying path. FIG. 1A is a circuit diagram where a conventional over power supply voltage cut-off method is embodied. FIG. 1B is a view of a metal fuse for the case where the method shown in FIG. 1A is applied to a semiconductor device.

Referring to FIG. 1A, a fuse F disposed on the power supply voltage supplying path becomes an open circuit when over (e.g., high) current or voltage flows due to an unstable power supply voltage so that the over power supply voltage is not provided to a load 10 connected to an output terminal of the fuse F.

In this method, the metal fuse as shown in FIG. 1B has a reduced metal area Fa which when blown becomes the open circuit portion.

Once, however, the metal fuse formed within the semiconductor circuit has blown, the recovery of the metal fuse is not possible, thereby resulting in the destruction of the semiconductor circuit.

Alternatively, if replaceable and the fuse as shown in FIG. 1A is cut off or blown, it has to be replaced with new one by a user which is inconvenient for the user.

SUMMARY OF THE INVENTION

Accordingly, the present invention is directed to a power supply voltage control circuit that substantially obviates one or more of the problems due to limitations and disadvantages of the related art.

An object of the present invention is to provide an over power supply voltage cut-off circuit which is capable of automatically cutting off a power supply voltage supplying path between a power supply voltage and a system by detecting an over power supply voltage, e.g., when the power supply voltage exceeds a predetermined voltage level because the power supply voltage is instantaneously raised due to an unstable power supply voltage, to thereby prevent the system from being damaged or adversely impacted.

Another object of the present invention is to provide an overvoltage dropping circuit which is capable of dropping a voltage which exceeds a normal voltage level down to the normal voltage level, to thereby provide the dropped voltage to a semiconductor chip.

These and other objects are achieved by a voltage cut-off circuit, comprising: voltage sensing means, connected to a power supply supplying a power supply voltage, for detecting if said power supply voltage is abnormal; control signal generating means for generating a control signal based on output from said voltage sensing means; and switching means for selectively supplying said power supply voltage to a load based on said control signal.

These and other objects are further achieved by a voltage attenuating circuit, comprising: voltage sensing means, connected to a power supply supplying a power supply voltage, for detecting if said power supply voltage is abnormal; control signal generating means for generating a control signal based on output from said voltage sensing means; and attenuating means for selectively attenuating said power supply voltage based on said control signal prior to supplying said power supply voltage to a load.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention: In the drawings:

FIG. 1A is a circuit diagram where a conventional over power supply voltage cut-off method is embodied;

FIG. 1B is a view of a metal fuse used in the circuit of FIG. 1A;

FIG. 2 is a circuit diagram illustrating an over power supply voltage cut-off circuit according to the present invention;

DETAILED DESCRIPTION OF PREFERRED EMBODIMENT

Figure 3:
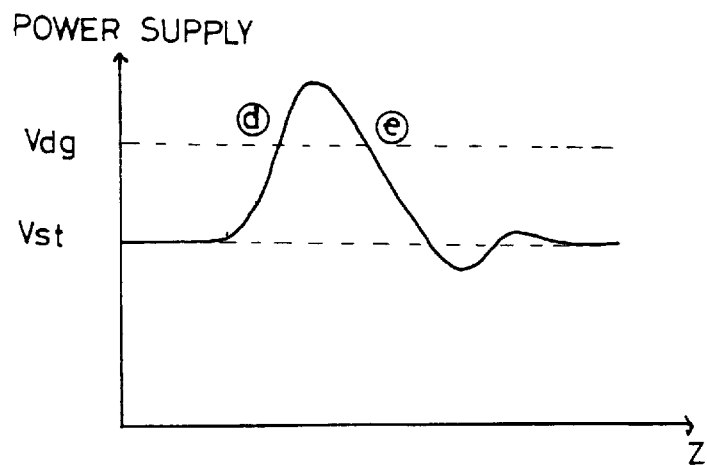
FIG. 3 is a waveform diagram for a power supply voltage within the over power supply voltage cut-off circuit of FIG. 2.

Reference will now be made in detail to the preferred embodiments of the present invention, examples of which are illustrated in the accompanying drawings.

Referring to FIG. 2, a circuit diagram illustrating an over power supply voltage cut-off circuit according to the present invention is shown. As shown, the circuit includes a voltage sensing part SV which is connected in parallel to two terminals of a power supply voltage generating part P and, in case where a level of a power supply voltage from the power supply voltage generating part P is over a predetermined set voltage level, senses an abnormal voltage level to thereby output an abnormal voltage sensing signal; a first NMOS transistor N1 which inputs to the drain thereof a driving signal from the voltage sensing part SV, inputs to the gate thereof an abnormal voltage sensing signal from the voltage sensing part SV to be thereby turned on/off, and has its source connected to a ground potential; and a second NMOS transistor N2 which has a drain connected to one terminal of the power supply voltage generating part P, a source connected to an input terminal of a load 10 and a gate inputting the driving signal, to thereby be turned on/off in accordance with the driving signal input. Accordingly, first NMOS transistor N1 performs a pull-down operation on the driving signal supplied to the second NMOS transistor N2 during a turn-on operation, to thereby turn off the second NMOS transistor N2.

The circuit shown in FIG. 2 further includes a first PMOS transistor P1 which inputs the driving signal to the gate thereof and has its drain connected to the ground potential; a fifth resistor R5 having a first terminal connected to the drain of the second NMOS transistor N2; and a light emitting diode LED connected between a second terminal of the resistor R5 and a source of the first PMOS transistor P1.

The voltage sensing part SV is preferably comprised of resistors R1 and R2 connected in serial to each other and resistors R3 and R4 connected in serial to each other. Each resistor pair being respectively coupled in parallel with the power supply voltage generating part P.

If a resistance value of the resistor R1 is relatively less than that of the resistor R2, the voltage sensing part SV serves to detect whether or not the power supply voltage is generated from the power supply voltage generating part P. This is because most of the power supply voltage generated is loaded on the second resistor R2 in accordance with the resistance ratio of the first and second resistors R1 and R2. If, for instance, a voltage level of 5 V from the power supply voltage generating part P is generated, the voltage level of the second resistor R2 is kept nearly at 5 V.

Meanwhile, if a resistance value of the resistor R3 is relatively greater than that of the resistor R4, the voltage sensing part SV serves to detect whether or not the power supply voltage generated from the power supply voltage generating part P is over the predetermined set voltage level. This is because most of the power supply voltage generated is loaded on the third resistor R3 in accordance with the resistance ratio of the third and fourth resistors R3 and R4. If, for instance, a voltage level of 5 V from the power supply voltage generating part P is generated, the voltage level of the fourth resistor R4 is kept less than 0.7 V.

Referring to FIG. 3, if the power supply voltage generated from the power supply voltage generating part P is not greater than an abnormal voltage Vdg, a potential level of a voltage divided by the first and second resistors R1 and R2 achieves an "H" state because of a voltage dropping effect according to the resistance ratio between the first and second resistors R1 and R2. That is, the value of the second resistor R2 is greater than that of the first resistor R1. Accordingly, the second NMOS transistor N2 is turned on to thereby transmit the power supply voltage generated from the power supply voltage generating part P to the load 10.

Figure 4:
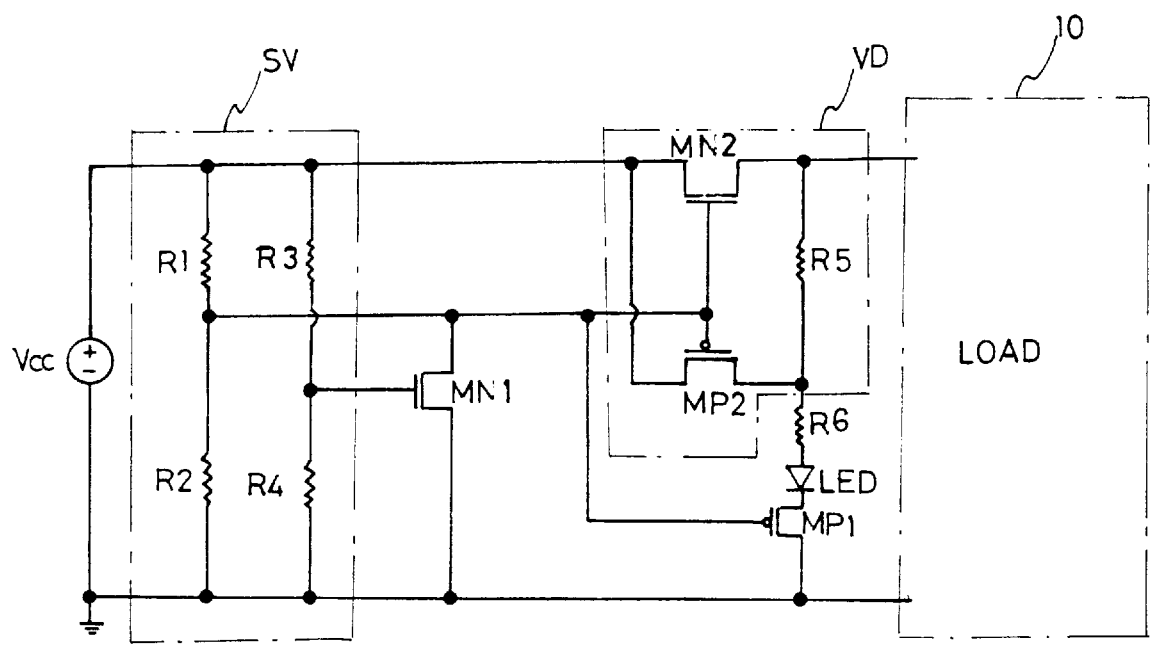
FIG. 4 is a circuit diagram illustrating an overvoltage dropping circuit according to the present invention.

To the contrary, if the power supply voltage generated from the power supply voltage generating part P is greater than the abnormal voltage Vdg, namely, if an overvoltage corresponding to the interval between points d and e in FIG. 4 is generated, a potential level of a voltage divided by the third and fourth resistors R3 and R4 achieves the "H" state because of the voltage dropping effect according to the resistance ratio between the third and fourth resistors R3 and R4. That is, the value of the third resistor R3 is greater than that of the fourth resistor R4 Accordingly, the first NMOS transistor N1 is turned on to thereby pull to ground potential the division-voltage of the first and second resistors R1 and R2 transmitted to the gate of the second NMOS transistor N2.

As a result, the potential of the signal input to the gate of the second NMOS transistor N2 achieves an "L" level, and thus the second NMOS transistor N2 is turned off, thereby preventing the overvoltage generated from the power supply voltage generating part P from being transmitted to the load 10.

Because the first PMOS transistor P1 has its gate, which is connected to the gate of the second NMOS transistor N2, inputting the "L" level voltage, the first PMOS transistor P1 is turned on. Thus, the first PMOS transistor P1 inputs to its source the power supply voltage provided to the drain of the second NMOS transistor N2 via the fifth resistor R5 and the light emitting diode LED, and the input voltage flows to the ground potential connected to the drain of the first PMOS transistor P1.

The turn-on operation of the first PMOS transistor P1 enables current within the light emitting diode LED to flow, and thereby the light emitting diode LED emits light so that a user can be informed that an overvoltage has been generated.

Next, if the power supply voltage generated from the power supply voltage generating part P falls under the abnormal voltage Vdg, a potential level of a voltage divided by the third and fourth resistors R3 and R4 is changed from the "H" state to the "L" state, to thereby turn off the first NMOS transistor N1. As a result, a normal power supply voltage supplying operation is performed to thereby supply a normal power supply voltage to the load 10.

The over power supply voltage cut-off circuit as discussed above may be provided within a semiconductor chip and can perform the functions of the fuse as depicted in FIG. 1A. When installed within a semiconductor chip, however, the light emitting diode LED is disposed in the exterior of the chip.

Furthermore, the resistance ratio among the resistors R1 to R4 may be properly adjusted in accordance with the power supply voltage generated from the power supply voltage generating part P, and, as readily apparent to one skilled in the art, additional components for protecting the MOS transistors N1, N2 and P1 may be needed.

The operation of the over power supply voltage cut-off circuit as discussed above prevents the load 10 from being damaged by cutting off the power supply voltage supplying path when the over power supply voltage is generated. Now, an explanation of the operation of an overvoltage dropping circuit according to the present invention will be discussed with reference to FIG. 4.

Referring to FIG. 4, in the case where the power supply voltage is commonly supplied to a plurality of module components within the semiconductor chip, an unstable voltage may be supplied due to the construction of a front-stage module. In this case, an overvoltage dropping circuit according to the present invention is connected to the rear-stage module to thereby enhance the reliability among the plurality of module components constituting the interior of the semiconductor chip.

As shown in FIG. 4, the circuit includes a voltage sensing part SV which is connected between a positive power supply voltage Vcc applied from the outside and ground potential, and, in case where a level of the positive power supply voltage Vcc is over a normal voltage level, senses an abnormal voltage level to thereby output an abnormal voltage sensing signal; a voltage dropping part VD which transmits the power supply voltage Vcc to an input terminal of a load 10 without any changes or drops it up to a predetermined voltage level in accordance with a sensed abnormal voltage level; a first NMOS transistor MN1 which has its gate inputting the abnormal voltage sensing signal outputted from the voltage sensing part SV to be thereby turned on/off, a source connected to a ground potential, and a drain connected to the voltage dropping part VD for performing a pull-down operation on the potential of the signal transmitted from the voltage sensing part SV to the voltage dropping part VD, during a turn-on operation, to thereby allow the voltage dropping part VD to perform a voltage dropping operation; a first PMOS transistor MP1 which inputs the signal transmitted from the voltage sensing part SV to the voltage dropping part VD at the gate thereof to be thereby turned on/off and has its drain connected to the ground potential; and a series connection of a resistor RG and light emitting diode LED between the voltage dropping part VD and the first PMOS transistor MP1.

The voltage sensing part SV is preferably comprised of resistors R1 and R2 connected in serial to each other and resistors R3 and R4 connected in serial to each other. Each resistance pair is respectively connected in parallel to the power supply voltage source. If a resistance value of the resistor R1 is relatively less than that of the resistor R2, the voltage sensing part SV serves to detect whether or not the positive power supply voltage Vcc is applied. This is because most of the positive power supply voltage Vcc applied is loaded on the second resistor R2 in accordance with the resistance ratio of the first and second resistors R1 and R2. If, for instance, a voltage level of 5 V is generated, the voltage level of the second resistor R2 is kept nearly at 5 V.

Meanwhile, if a resistance value of the resistor R3 is relatively greater than that of the resistor R4, the voltage sensing part SV serves to detect whether or not the positive power supply voltage Vcc applied is at an overvoltage level. This is because most of the positive power supply voltage Vcc applied is loaded to the third resistor R3 in accordance with the resistance ratio of the third and fourth resistors R3 and R4. If, for instance, a voltage level of 5 V is generated, the voltage level of the fourth resistor R4 is kept less than 0.7 V.

Preferably, the voltage dropping part VD is comprised of a second NMOS transistor MN2 which has a drain connected to the positive power supply voltage Vcc, a source connected to the input terminal of the load 10 and a gate inputting a voltage signal divided by the first and second resistors R1 and R2; a second PMOS transistor MP2 which has a source connected to the drain of the second PMOS transistor MP2 and is turned on/off according to the voltage signal divided by the first and second resistors R1 and R2 input to the gate thereof, the second PMOS transistor MP2 being turned off in case that the second NMOS transistor MN2 is turned on; and a fifth resistor R5 connected between the source of the second NMOS transistor MN2 and the drain of the second PMOS transistor MP2 which drops a voltage input through the drain of the second NMOS transistor MN2 during the turn-on operation of the second PMOS transistor MP2 to thereby transmit the dropped voltage to the input terminal of the load 10.

Returning to FIG. 3, if the positive power supply voltage Vcc applied from the outside is not over the abnormal voltage Vdg, a potential level of a voltage divided by the first and second resistors R1 and R2 achieves the "H" state because of the voltage dropping effect according to the resistance ratio between the first and second resistors R1 and R2. That is, the value of the second resistor R2 is greater than that of the first resistor R1. Accordingly, the second NMOS transistor MN2 is turned on to thereby transmit the positive power supply voltage Vcc to the load 10.

To the contrary, if the positive power supply voltage Vcc is over the abnormal voltage Vdg, a potential level of a voltage divided by the third and fourth resistors R3 and R4 is changed from the "L" state to the "H" state because of the voltage dropping effect according to the resistance ratio between the third and fourth resistors R3 and R4. That is, the value of the third resistor R3 is greater than that of the fourth resistor R4. Accordingly, the first NMOS transistor MN1 is turned on to thereby pull to ground potential the division-voltage of the first and second resistors R1 and R2 transmitted to the gate of the second NMOS transistor MN2. As a result, the second NMOS transistor MN2 is turned off, thereby to prevent the positive power supply voltage Vcc having the abnormal voltage level from being transmitted to the load 10.

When the first NMOS transistor MN1 is turned on, the potential of the input signal to the gate of the second NMOS transistor MN2 achieves the "L" state, and the second PMOS transistor MP2 having the gate connected to the gate of the second NMOS transistor MN2 is turned on. Thereby, the power supply voltage Vcc applied to the is drain of the second NMOS transistor MN2 is output through the source of the second PMOS transistor MP2 to the drain thereof.

The power supply voltage input to the drain of the second PMOS transistor MP2 is partially transmitted to the load 10 via the fifth resistor R5, which serves to drop the voltage transmitted to the load 10 by an amount corresponding to the difference between the overvoltage and the normal voltage.

Since an operation of a warning part including the sixth resistor R6, the light emitting diode LED and the first PMOS transistor MP1 is the same as mentioned in the above, an explanation thereof will be avoided for brevity of description.

In the embodiments of the present invention where the division-voltage of the third and fourth resistors R3 and R4 determines as to whether or not an overvoltage is generated, an operation for more accurately detecting the overvoltage will be explained with reference to FIGS. 5 and 6.

Figure 5:
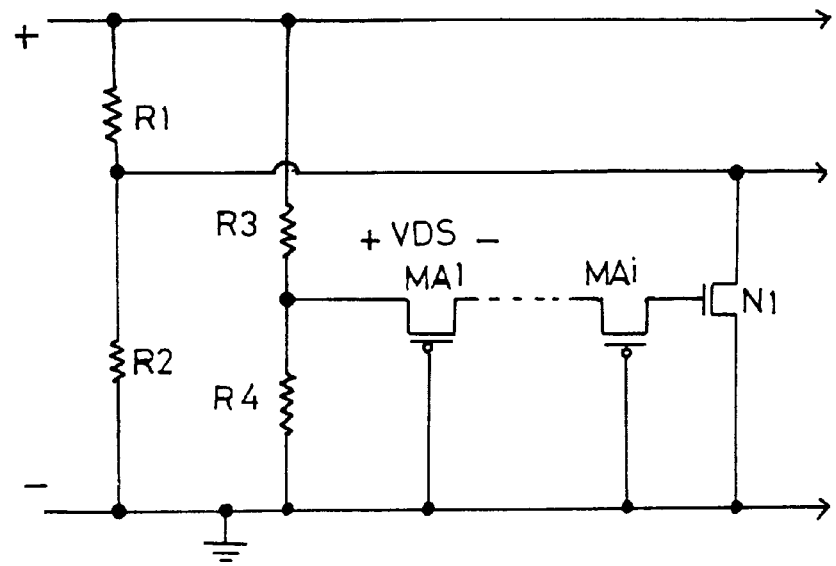
FIG. 5 is a circuit diagram illustrating an embodiment of an overvoltage detecting means of the voltage sensing part according to the present invention.

Referring to FIG. 5, the signal to be applied to the gate of the first NMOS transistor N1 passes multistage MOS transistors MA1 to MAi to experience a drop of the voltage between the drain and source of each MOS transistor thereof, to thereby maintain a more reliable gate voltage at the first NMOS transistor N1. When compared with the embodiment of FIG. 2 merely using resistors, there is an advantage in that it is easy for the potential of the gate of the first NMOS transistor N1 to be arbitrarily set.

Figure 6:
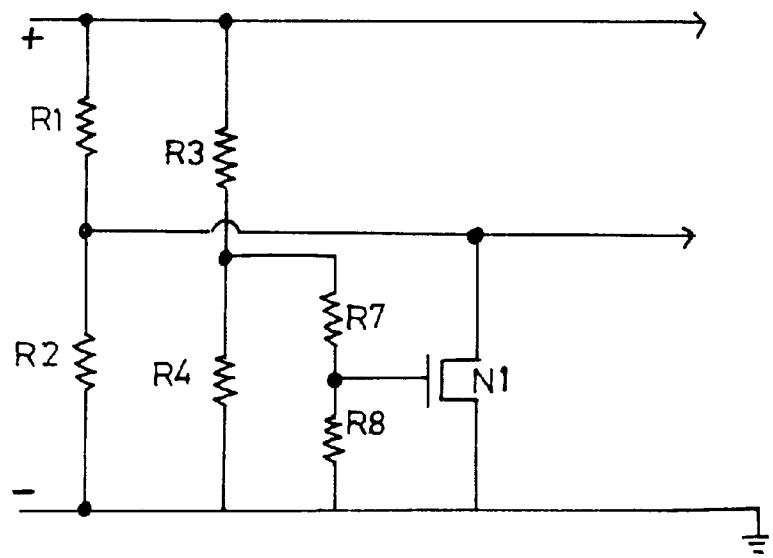
FIG. 6 is a circuit diagram illustrating another embodiment of an overvoltage detecting means of the voltage sensing part according to the present invention.

Referring to FIG. 6, multistage, series connected resistors R7 and R8 are connected in parallel with resistor R4, and the gate of the first NMOS transistor N1 is connected to the connection between resistors R7 and R8. Resistors R7 and R8 are used to prevent the gate potential of the first NMOS transistor N1 from oscillating.

As discussed above, an over power supply voltage cut-off circuit according to the present invention is capable of automatically cutting off a power supply voltage supplying path between a power supply voltage and a system by detecting an over power supply voltage, e.g., when the power supply voltage exceeds a predetermined voltage level because the power supply voltage is instantaneously raised due to an unstable power supply voltage, to thereby prevent the system from being damaged or adversely impacted.

It will be apparent to those skilled in the art that various modifications and variations can be made in an over power supply voltage cut-off circuit of the present invention without departing from the spirit or scope of the invention. Thus, it is intended that the present invention cover the modifications and variations of this invention provided they come within the scope of the appended claims and their equivalents.

What is claimed is:

1. A voltage cut-off circuit, comprising:
    a voltage sensing circuit, connected to a power supply supplying a power supply voltage, detecting when said power supply voltage is abnormal and generating a driving voltage greater than a threshold voltage when said power supply voltage is abnormal, said voltage sensing circuit including,
        a first voltage divider generating a voltage substantially equal to said power supply voltage,
        a second voltage divider generating said driving voltage greater than said threshold voltage when said power supply voltage is abnormal, and
        a threshold stabilizing circuit stabilizing said threshold voltage, said threshold stabilizing circuit including a third voltage divider connected between said output of said second voltage divider and a reference potential;
    a control signal generating circuit generating a control signal based on output from said third voltage divider;
    a switching circuit selectively supplying said power supply voltage to a load based on said control signal; and
    a shunt circuit selectively shunting said power supply voltage based on said control signal, said shunt circuit including a warning circuit for generating a user identifiable warning when said voltage sensing circuit detects that said power supply voltage is abnormal.

2. The circuit of claim 1, wherein
    said control signal generating circuit generates a cut-off control signal when said voltage sensing circuit detects that said power supply voltage is abnormal; and
    said switching circuit, in response to said cut-off control signal, prevents said power supply voltage from being supplied to said load.

3. The circuit of claim 1, wherein said warning circuit includes a light emitting diode.

4. A voltage cut-off circuits comprising:
    a voltage sensing circuit, connected to a power supply supplying a power supply voltage, detecting when said power supply voltage is abnormal and generating a driving voltage greater than a threshold voltage when said power supply voltage is abnormal, said voltage sensing circuit including,
        a first voltage divider generating a voltage substantially equal to said power supply voltage,
        a second voltage divider generating said driving voltage greater than said threshold voltage when said power supply voltage is abnormal, and
        a threshold stabilizing circuit stabilizing said threshold voltage; a control said generating circuit generating a control signal based on said driving voltage;
    a switching circuit selectively supplying said power supply voltage to a load based on said control signal;
    a shunt circuit selectively shunting said power supply voltage based on said control signal, said shunt circuit including a warning circuit for generating a user identifiable warning when said voltage sensing circuit detects that said power supply voltage is abnormal; and
    wherein
    said threshold stabilizing circuit includes at least one P-MOS transistor connected between output of said second voltage divider and said control signal generating circuit, said P-MOS transistor having a gate connected to a reference voltage.

5. A voltage attenuating circuit, comprising:
    a voltage sensing circuit connected to a power supply supplying a power supply voltage, detecting when said power supply voltage is abnormal and generating a driving voltage greater than a threshold voltage when said power supply voltage is abnormal, said voltage sensing circuit including,
        a first voltage divider generating a voltage substantially equal to said power supply voltage,
        a second voltage divider generating said driving voltage greater than said threshold voltage when said power supply voltage is abnormal, and
        a threshold stabilizing circuit stabilizing said threshold voltage, said threshold stabilizing circuit including a third voltage divider connected between said output of said second voltage divider and a reference potential;
    a control signal generating circuit generating a control signal based on output from said third voltage divider; and
    an attenuating circuit selectively attenuating said power supply voltage to a non-zero voltage based on said control signal prior to supplying said power supply voltage to a load.

6. The circuit of claim 5, wherein
    said control signal generating circuit generates an attenuate control signal when said voltage sensing circuit detects that said power supply voltage is abnormal; and
    said attenuating circuit, in response to said attenuate control signal, attenuates said power supply voltage prior to supplying said power supply voltage to said load.

7. The circuit of claim 5, further comprising:
    a warning circuit generating a user identifiable warning when said voltage sensing circuit detects that said power supply voltage is abnormal.

8. The circuit of claim 7, wherein said warning circuit includes a light emitting diode.

9. The circuit of claim 5, wherein said voltage sensing circuit, said control signal generating circuit and said attenuating circuit are formed as part of a semiconductor chip having a power consumption type of load.

10. A voltage attenuating circuit, comprising:
    a voltage sensing circuit, connected to a power supply supplying a power supply voltage, detecting when said power supply voltage is abnormal, said voltage sensing circuit including,
        a first voltage divider generating a voltage substantially equal to said power supply voltage, and
        a second voltage divider generating a voltage greater than a threshold voltage when said power supply voltage is abnormal;
    a control signal generating circuit generating a control signal based on output from said second voltage divider; and an attenuating circuit selectively attenuating said power supply voltage to a non-zero voltage based on said control signal prior to supplying said power supply voltage to a load, said attenuating circuit including, a resistor, a first NMOS transistor having a drain receiving said power supply voltage, a source connected to said load and connected to a first terminal of said resistor, and a gate receiving said control signal, and a first PMOS transistor having a source receiving said power supply voltage, a gate receiving said control signal, and a drain connected to a second terminal of said resistor.

11. The circuit of claim 10, wherein said control signal generating circuit comprises:

a second NMOS transistor having a drain receiving output of said first voltage divider, a source connected to a reference potential, and a gate receiving output of said second voltage divider.

12. A voltage attenuating circuit, comprising:

a voltage sensing circuit, connected to a power supply supplying a power supply voltage, detecting when said power supply voltage is abnormal and generating a driving voltage greater than a threshold voltage when said power supply voltage is abnormal, said voltage sensing circuit including, a first voltage divider generating a voltage substantially equal to said power supply voltage, a second voltage divider generating said driving voltage greater than said threshold voltage when said power supply voltage is abnormal, and a threshold stabilizing circuit stabilizing said threshold voltage;

a control signal generating circuit generating a control signal based on said driving voltage; and an attenuating circuit selectively attenuating said power supply voltage to a non-zero voltage based on said control signal prior to supplying said power supply voltage to a load; and wherein said threshold stabilizing circuit includes at least one P-MOS transistor connected between output of said second voltage divider and said control signal generating circuit, said P-MOS transistor having a gate connected to a reference voltage.

* * * * *